(No Model.) 3 Sheets—Sheet 1.

A. H. RUSSELL.
MAGAZINE GUN.

No. 295,286. Patented Mar. 18, 1884.

Witnesses
Jno. A. Gayer
Philip Hawley

Inventor
Andrew H Russell
By Wallace H Bartlett
His atty.

(No Model.) 3 Sheets—Sheet 2.

A. H. RUSSELL.
MAGAZINE GUN.

No. 295,286. Patented Mar. 18, 1884.

Witnesses
Jno. A. Gayer
Philip Hawley.

Inventor
Andrew H. Russell
By Wallace A. Bartlett
His atty.

(No Model.) 3 Sheets—Sheet 3.
A. H. RUSSELL.
MAGAZINE GUN.
No. 295,286. Patented Mar. 18, 1884.
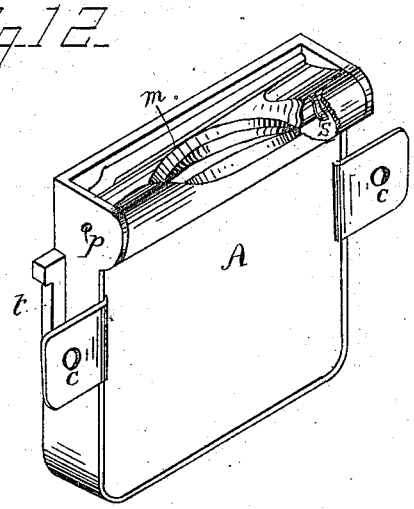
Fig. 12.
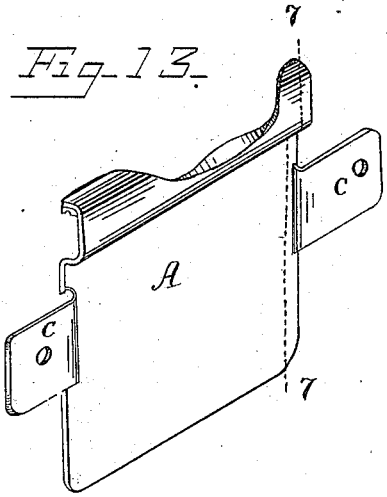
Fig. 13.
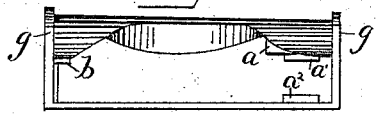
Fig. 15.
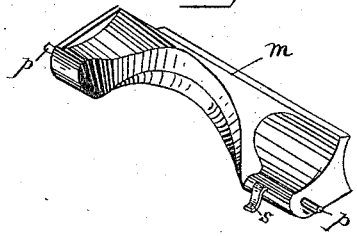
Fig. 18.
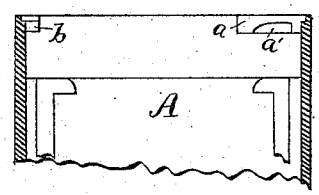
Fig. 14.
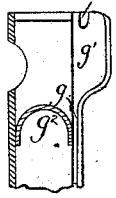
Fig. 16.
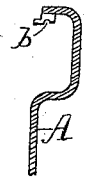
Fig. 17.
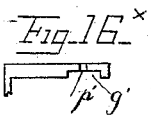
Fig. 16.ˣ
Witnesses
Jno. A. Gayer
Philip Hawley
Inventor
Andrew H Russell
By Wallace H Bartlett
His atty.

UNITED STATES PATENT OFFICE.

ANDREW H. RUSSELL, OF THE UNITED STATES ARMY.

MAGAZINE-GUN.

SPECIFICATION forming part of Letters Patent No. 295,286, dated March 18, 1884.

Application filed November 8, 1883. (No model.)

*To all whom it may concern:*

Be it known that I, ANDREW H. RUSSELL, a citizen of the United States, of the United States Army, have invented certain new and useful Improvements in Magazine-Guns, of which the following is a specification, reference being had therein to the accompanying drawings.

My invention relates to magazine-guns; and it consists in certain improvements hereinafter pointed out and claimed.

The object of my invention is to produce an improved magazine-arm of that class in which the cartridges are placed side by side in a magazine, and the column of cartridges fed sidewise toward the receiver, which I here denominate a "side-push" magazine, in contradistinction to such as contain the cartridges in a tube and feed them endwise toward the receiver, here called an "end-push" magazine; also, to adapt a side-push magazine to a particular form of breech-block, as hereinafter stated.

Figure 1:
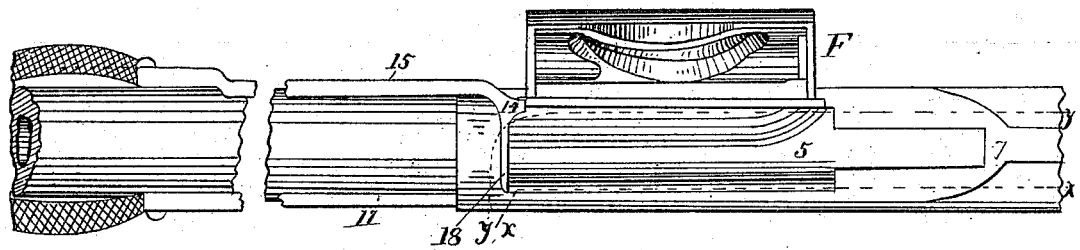
Figure 2:
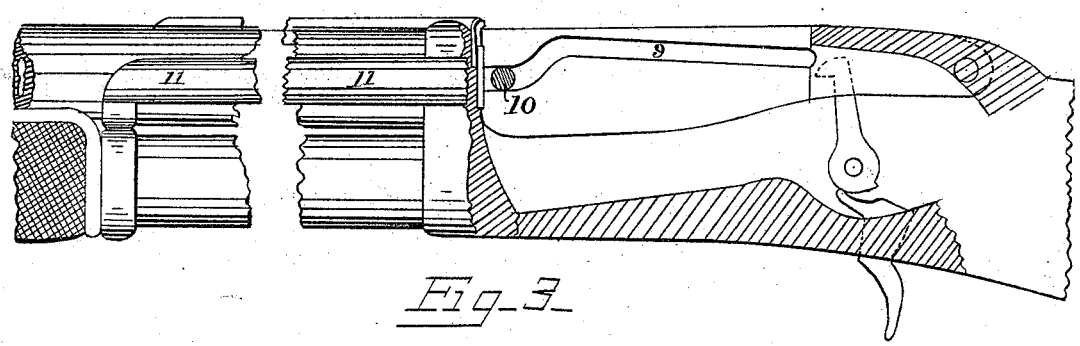
Figure 3:
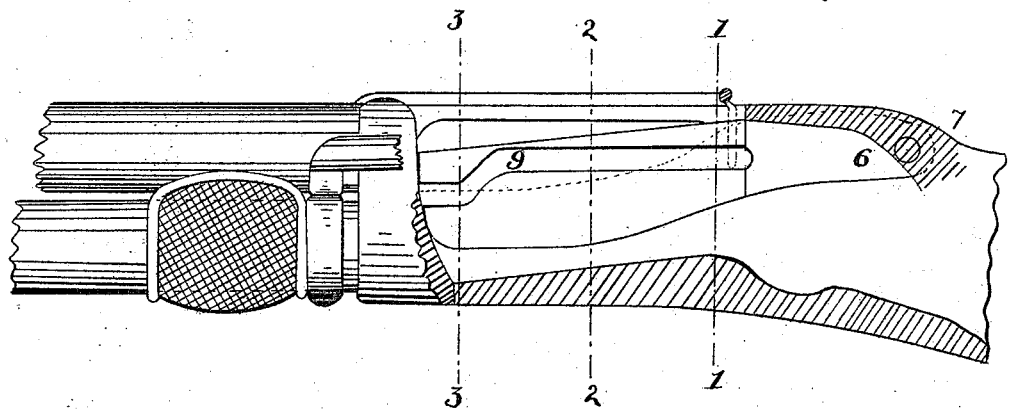
Figure 4:
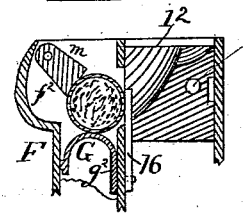
Figure 5:
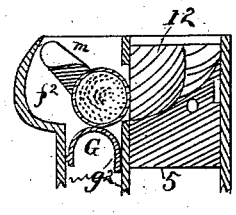
Figure 6:
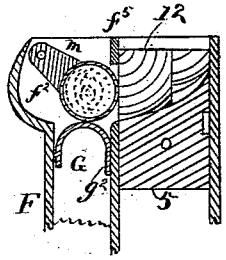
Figure 7:
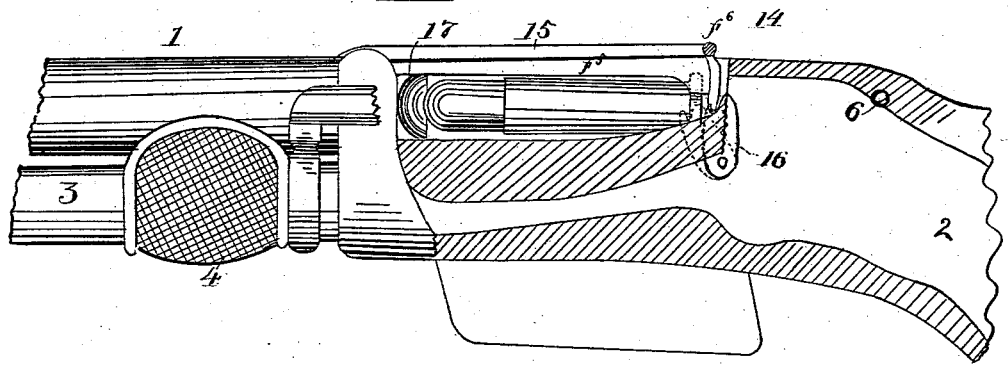
Figure 8:
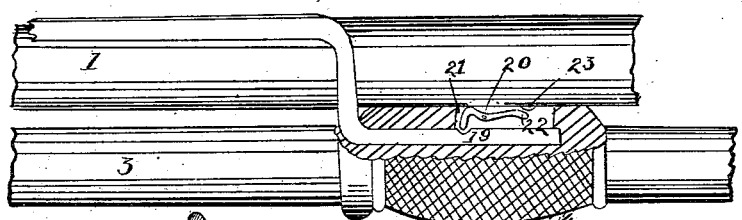
Figure 9:
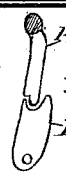
Figure 10:
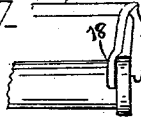
Figure 11:
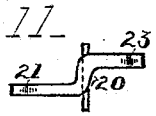

In the drawings, Figure 1 is a plan view of the breech mechanism and the magazine of my improved arm. Fig. 2 is a side elevation, partly in section on the line $x$ $x$ of Fig. 1, showing breech closed. Fig. 3 is a similar view, showing breech-block open. Fig. 4 is a cross-section on line 1 1, Fig. 3. Fig. 5 is a similar section on line 2 2, and Fig. 6 a similar section on line 3 3, the lower portion of the magazine being omitted in each case. Fig. 7 is a view similar to Fig. 3, in section on line $y$ $y$, showing a cartridge in place in the mouth of the magazine. Fig. 8 is a side elevation, partly sectioned, showing mode of attachment of inserter and extractor bar to handle. Figs. 9, 10, 11 are details, hereinafter referred to. Fig. 12 is a perspective view of a modification of my magazine detached from the gun; Fig. 13, the right-hand-side plate of the same; Fig. 14, a reverse side elevation, partly in section, of the same; Fig. 15, a plan of the magazine-casing; Fig. 16, a cross-section of the upper part of the same. Fig. $16^\times$ is a plan of one end of the magazine-casing, the back-plate being omitted; Fig. 17, a section of the upper part of side plate; Fig. 18, a perspective of the swinging gate $m$ detached.

The parts of the magazine shown in Figs. 12 to 18 are improvements on the device shown in my application filed July 26, 1883. For a full description of the construction and operation of the magazine reference is made to said application.

To enable a cartridge-feed case to be quickly applied to the magazine, a small piece, $a$, is placed at the top of the right-hand-side plate of the magazine, having a projection, $a'$, which extends slightly inward. On the inside plate of the magazine there is a small projection, $a^2$, and at the front end of the magazine a slight projection, $b$. These projections do not extend inward far enough to obstruct the entrance of a cartridge into the magazine, and space is left at the end $a'$ $a^2$ for the passage of a cartridge-flange. The projections form a seat for my cartridge-feed case in loading the magazine.

The cartridge-feed case referred to is a small bottomless box, preferably such a box as is shown in patent to Livermore and Russell, No. 278,980, June 5, 1883. This box is placed above the magazine, its lower end resting on the projections in the magazine, and by a simple movement of the thumb or finger the cartridges in the feed-case are forced into the magazine. The feed-case may then be thrown away. The right-hand plate, forming the outer side, A, of the magazine, is made to slip down in groove $g$, Fig. 16, in the end walls of the magazine. The gate $m$ has hinge-pins $p$ $p$, which come beneath projections on the plate A, (see $b$, Fig. 17,) and the spring $s$, also coming under an abutment on plate A, (see Fig. 12,) tends to hold the gate $m$ forward. The portion $g'$ of the end of the magazine is depressed to the same depth as groove $g$, to allow the plate A to slip down and rest against the rib $g^2$ at the outer edge of said wall. A slot, $p'$, serves as a lower bearing for pin $p$. Both ends of the magazine are similar in respect to groove, depression, and slot. The wings $c$ serve to secure the plate in position by screws passing therethrough into the stock. The magazine F is attached to the right-hand side of the arm, either permanently, or is made removable in the manner described in said application, or in other suitable manner. The column of cartridges will be lifted by follower G, and the top one pressed toward the opening in the side of the magazine which leads into the receiver under spring-gate, which swings out from recess $f^2$, tending to press the cartridge under the cross-bar $f^3$.

The numeral 1 represents the barrel of the gun; 2, the stock; 3, a pin or guide parallel with the barrel, on which the handle 4 is made to reciprocate in operating the breech mechanism of the arm, as in the improved Spencer arm.

The breech-block 5 is quite similar in its movement to the well-known "Peabody" breech-block, and is pivoted at 6 somewhat in rear of the cartridge-chamber in the receiver. The recoil may be taken up on the pin 6 or on abutment 7. The block may be perforated lengthwise at 8, preferably in a diagonal direction, for the passage of the firing-pin; but as my present invention does not relate to the firing mechanism, it will be unnecessary to describe such, as any well-known firing mechanism adapted to the Peabody or Martini breech system may be used. The left side of the breech-block has a cam-groove, 9, in which a pin, roller, or projection, 10, from rod 11 is adapted to reciprocate. Rod 11 being attached or connected to handle 4, the reciprocation of said handle will cause the breech-block to rise and fall. The cam-groove 9 has a steep incline near the front of the breech-block, so that the movement of the block may be quick in opening and closing. The cam-groove may be so shaped as to throw the block entirely open at the first movement of the handle, or it may be thrown open only far enough to allow the shell to be extracted, and not quite far enough to allow a cartridge to escape from the magazine, the latter movement being made as the handle reaches its rearmost position, and the cam-groove so shaped as to raise the block at the proper time. Then, by an adjustable stop, the movement of the handle may be limited, so that the magazine will not be brought into operation, the arm will thus be in condition for use as a single loader. The block 5 is rounded or cut away at the right upper corner, as at 12, so that when the block is down to its lowermost position there will be room between the corner of said block and the bar $f^5$ for the passage of a cartridge from the magazine F through the receiver over the block 5, and into the chamber of the gun.

The cartridge which is in the mouth of the magazine, as shown in Fig. 7, is kept from passing into the receiver by the projection $f^6$ on bar $f^5$, and can only pass into the receiver when it has been drawn a little way forward. The forward movement is produced by the inserter 14, which is attached to rod 15, which connects to handle 4, as will be hereinafter explained. The inserter 14 in its backward movement, when propelled by the reciprocation of handle 4, encounters a gate, 16, pivoted or otherwise arranged to swing or slide a little way alongside of the flange of the top cartridge in the magazine, preferably pressed into such position by a spring. As the inserter 14 pushes back the said gate, the cartridge will be pressed by the swinging gate $m$ a little way sidewise, so that the flange projects slightly into the receiver. The inserter will thus be behind the flange of the cartridge, and when moved forward will carry the cartridge with it.

The front or bullet end of the cartridge will be guided into the receiver by the incline 17, near the front of the magazine, and as soon as the flange is drawn forward beyond the projection $f^6$ the cartridge will be forced sidewise into the receiver by the combined pressure of the follower and spring-gate.

The rod 15 carries the inserter 14 and also the extractor 18, the latter being offset, so as to be a little farther forward than the inserter 14, and preferably at the other side of the receiver, as shown in Figs. 1 and 10. When the inserter travels forward behind the flange of the cartridge, the extractor moves in front of said flange.

The rear end of the barrel is notched or cut away so that the extractor may close into place, as is usual.

The extractor 18 may be made to spring over the flange of a cartridge in well-known manner, if by any means the flange should get forward of said extractor; or the inserter 14 may carry a spring-hook, and thus operate as inserter and extractor. The top cartridge in the magazine or the follower prevents the shell from slipping sidewise while it is being extracted.

A projection may be placed in the path of movement of the shells in extracting, so that the backward movement of the extractor flips out the shell from the receiver, as is common with shell-ejectors. An extractor similar to the Martini, Henry, or Peabody may be used, or a shell-starter, as shown Figs. 2 and 9, Spencer-Lee gun, Report Chief of Ordnance, 1882.

The gate 16, which, as shown in Figs. 7 and 9, swings forward to the position shown in dotted lines, has a notch at its front corner into which the end of the inserter projects as the said inserter moves the gate positively both backward and forward.

In order that the breech-block may open enough to allow the shell to pass said block before the extractor begins its backward movement, there is a lost motion between the handle 4 and bar 15. This lost motion may be produced by a catch or coupling similar to that shown in Fig. 8, which permits the handle 4 to have a movement independent of bar or rod 15.

Let 19 represent a notch in rod 15, and 20 a catch pivoted in the handle, so that the end 21 shall enter said notch, except when the end 22 comes in contact with lug 23 on the barrel, when the catch will be released from the notch and the handle will be free to move forward— that is, toward the muzzle of the gun—without pulling the rod with it. This lug 23 is so placed as to release the catch at the time the inserter has forced the cartridge to its seat in the barrel. The further movement of the handle closes the breech-block through rod 11 and its connections.

The catch 20 may be offset or "staggered," as shown in plan in Fig. 11, to prevent the end 21 from striking the projection 23.

The lug 23 may in some cases be dispensed with, the catch 20 engaging the notch with sufficient force to move the bar when there is little resistance, but releasing itself when the resistance becomes great, as when the cartridge is fully home.

The operation is as follows: Supposing the breech to be closed, the magazine filled, and a shell or cartridge in the barrel, the first movement of the handle backward toward the stock opens the breech-block. At the moment the block is down the rod 15 is engaged by the handle, and the further backward movement of the handle operates the extractor to take out the shell. When the rod 15 has nearly reached its rearmost position, the inserter 14 engages gate 16 and swings it back. The cartridge then moves so its flange projects slightly into the receiver, (or, if projection $f^6$ be cut away, it will move entirely into the receiver.) The reverse movement of handle 4 carries the cartridge forward, at the same time turning gate 16 to exclude the next cartridge; or the gate may be moved forward by a spring, the cartridge as it passes into the receiver resting on top of the breech-block. When the cartridge is "home" in the chamber of the gun, the inserter and extractor bar or rod becomes disengaged from the sliding handle, as already explained, and the further movement of the handle closes the breech-block, ready for firing.

I claim—

1. The combination, with the receiver of a breech-loading arm, of a breech-block pivoted at the rear and adapted to swing downward to open the breech of the arm, said breech-block being cut away at the side, as described, a side-push magazine arranged to feed a cartridge sidewise upon said block, and mechanism, substantially as described, for retaining the succeeding cartridges in the magazine, substantially as set forth.

2. The combination, with the receiver of a breech-loading arm, of a breech-block pivoted at the rear, so as to open the breech by swinging downward, a side-push magazine arranged to feed a cartridge upon said block, mechanism, substantially as described, for retaining the remaining cartridges in the magazine, and an inserter for carrying the cartridge into the barrel, substantially as set forth.

3. The combination, with the receiver of a breech-loading fire-arm, of a breech-block pivoted at the rear, so as to swing downward to open the breech, a side-push magazine arranged, as described, to feed a cartridge upon said block, mechanism, substantially as described, to retain the remaining cartridges in the magazine, a sliding inserter-bar, and an inserter and extractor carried by said bar, all substantially as described.

4. The combination, with the receiver of a breech-loading fire-arm, of a breech-block pivoted at the rear, so as to swing downward to open the breech, a side-push magazine arranged, as described, to feed a cartridge upon said block, mechanism, substantially as described, to retain the remaining cartridges in the magazine, an inserter and extractor carried by a reciprocating rod, and mechanism connecting the rod and operating-handle, substantially as described, whereby there is lost motion between the two, substantially as set forth.

5. The combination, with a side-push magazine having a side opening into a receiver, of a movable gate adapted, as described, to partially close said opening, and a cartridge-inserter arranged, as described, to operate said gate, substantially as stated.

6. The combination, with a side-push magazine having a side opening into the receiver, of a swinging notched gate pivoted near the rear end of said magazine, and a cartridge-inserter arranged to reciprocate, as described, and engage the notch in said gate, so as to swing the same in either direction, substantially as set forth.

7. In a magazine fire-arm, a reciprocating bar, operative mechanism, substantially as described, to reciprocate the same, and a cartridge-inserter and an extractor carried by said bar, the latter arranged to be in front of the flange of a cartridge while the inserter is behind the same, substantially as set forth.

8. The combination, in a magazine fire-arm, of a reciprocating sleeve or handle, an inserter-bar having a notch therein, and a pivoted catch in the handle adapted, as described, to engage said notch, all substantially as stated.

9. The combination, in a magazine fire-arm, of an operating sleeve or handle arranged to reciprocate, as stated, a notched inserter-bar, a pivoted catch in the handle, arranged to engage said notch, and a lug on the barrel, arranged, as described, to operate said catch, all as and for the purpose hereinbefore set forth.

10. A side-push magazine of the character described, having projections (as $a'$ $a^2$ $b$) near the top and inside thereof, to afford a seat for a cartridge-feed case.

11. A side-push magazine of the character described, having its end walls grooved and slotted, as described, combined with a side plate (as A) made to fit said grooves and cover the tops of the slots, and a gate, $m$, with end pivots extending into said slots, all in combination, substantially as set forth.

In testimony whereof I affix my signature in presence of two witnesses.

ANDREW H. RUSSELL.

Witnesses:
JAMES BARRY,
JAMES BOYLE.